(12) United States Patent
Miedema (10) Patent No.: US 9,060,215 B2
(45) Date of Patent: Jun. 16, 2015

(54) NETWORK SPECIFIC ROUTING AND WAVELENGTH ASSIGNMENT FOR OPTICAL COMMUNICATIONS NETWORKS

(71) Applicant: Ciena Corporation, Hanover, MD (US)

(72) Inventor: David Miedema, Ottawa (CA)

(73) Assignee: Ciena Corporation, Hanover, MD (US)

( * ) Notice: Subject to any disclaimer, the term of this patent is extended or adjusted under 35 U.S.C. 154(b) by 156 days.

(21) Appl. No.: 13/939,071

(22) Filed: Jul. 10, 2013

(65) Prior Publication Data

US 2014/0334817 A1 Nov. 13, 2014

Related U.S. Application Data

(60) Provisional application No. 61/821,764, filed on May 10, 2013.

(51) Int. Cl.
*H04B 10/00* (2013.01)
*H04Q 11/00* (2006.01)
*H04J 14/02* (2006.01)

(52) U.S. Cl.
CPC ........ *H04Q 11/0062* (2013.01); *H04J 14/0227* (2013.01); *H04Q 11/0005* (2013.01)

(58) Field of Classification Search
USPC .............................................. 398/45–51, 140
See application file for complete search history.

(56) References Cited

U.S. PATENT DOCUMENTS

| | | | | |
|---|---|---|---|---|
| 6,538,777 | B1 * | 3/2003 | Barry et al. ..................... | 398/25 |
| 6,728,484 | B1 * | 4/2004 | Ghani ............................. | 398/42 |
| 7,599,621 | B2 * | 10/2009 | Guy et al. ........................ | 398/57 |
| 8,521,022 | B1 * | 8/2013 | Sriram et al. ................... | 398/57 |
| 2010/0142943 | A1 * | 6/2010 | Frankel et al. .................. | 398/25 |
| 2010/0220996 | A1 * | 9/2010 | Lee et al. ........................ | 398/25 |
| 2012/0148234 | A1 * | 6/2012 | Bellagamba et al. ........... | 398/28 |
| 2012/0321297 | A1 * | 12/2012 | Bottari et al. ................... | 398/26 |
| 2013/0216226 | A1 * | 8/2013 | Hirano et al. ................... | 398/51 |
| 2014/0334817 | A1 * | 11/2014 | Miedema ........................ | 398/48 |
| 2014/0341572 | A1 * | 11/2014 | Sambo et al. ................... | 398/48 |

* cited by examiner

*Primary Examiner* — Agustin Bello
(74) *Attorney, Agent, or Firm* — Clements Bernard PLLC; Christopher L. Bernard; Lawrence A. Baratta, Jr.

(57) ABSTRACT

To facilitate routing and wavelength assignment (RWA) in an optical communications network having a given topology of associated nodes and links, a set of system characteristics associated with operating the optical communications network may be determined. Different sets of values may be selected for one or more parameters of an RWA algorithm defined for operating a set of services on the optical communications network, and associated sets of routes and wavelengths that may be assigned to the set of services via the RWA algorithm in accordance with the different sets of values and the set of system characteristics may be determined. The different sets of routes and wavelengths may be compared based on one or more fitness criteria and thereby selected between. A path computation engine of the optical communications network may then be provisioned with the selected set of values for the one or more parameters.

20 Claims, 5 Drawing Sheets

NETWORK SPECIFIC ROUTING AND WAVELENGTH ASSIGNMENT FOR OPTICAL COMMUNICATIONS NETWORKS

CLAIM OF PRIORITY UNDER 35 U.S.C. §119

The present application for patent claims the benefit of U.S. Provisional Application No. 61/821,764, entitled "NETWORK SPECIFIC ROUTING AND WAVELENGTH ASSIGNMENT FOR OPTICAL COMMUNICATIONS NETWORKS," filed May 10, 2013, assigned to the assignee hereof, and expressly incorporated herein by reference.

FIELD OF DISCLOSURE

This disclosure relates generally to telecommunications, and more particularly to routing and wavelength assignment for optical communications networks and the like.

BACKGROUND

Optical communication systems are replacing other communication mediums due to several advantages over conventional systems. For example, optical communication systems typically provide wide bandwidth and low attenuation, immunity to electrical noise, and the ability to securely transmit signals over long distances, including transoceanic links. As the networks in these systems grow in size and complexity, however, it has become increasingly difficult yet important to implement efficient routing and wavelength assignment (RWA) algorithms.

The simplest routing algorithm has no knowledge of the network state and selects in advance a path or set of paths to be attempted when service is activated. If the network blocks the setup due to a failure or blocking of a path due to wavelength fragmentation or exhaustion, the next path is attempted until service setup is successful or fails. Network aware routing improves on this approach by flooding network state information through the network (e.g., link up/down or wavelength availability per link). Conventional network aware routing algorithms use this information to preselect from the available paths the paths most likely to succeed. They attempt to avoid paths on which a link has failed, and avoid paths which do not need the requirement for wavelength continuity and have no available wavelengths to carry the service. Typically, routing decisions take place first (sometimes with some knowledge that there is at least one wavelength available), and once a route has been selected, a wavelength assignment algorithm is run to select a wavelength for the service.

There are a variety of conventional approaches to selecting a wavelength, each providing varying levels of success for both the path in question and future paths. Random Assignment, for example, selects a wavelength at random from the available wavelengths on the path. First Fit Assignment selects the first wavelength available in a pre-determined order from the available wavelengths on the path. Close Neighbor Wavelength Assignment selects the wavelength that minimizes gaps between this wavelength and the wavelength in question on neighboring nodes at the start and end of the path. The concept is to prefer a wavelength which has the most neighboring services occupying that wavelength. This attempts to avoid gaps where possible. Most Usage/Least Used Assignment selects the wavelength from the available set which is used the most/least in the network. The advantage of selecting the most-used wavelength is that it attempts to pack more services into the least number of wavelengths, leaving the other wavelengths available for future provisioning or restoration actions. The idea of selecting the least-used wavelength is to spread the service across as many wavelengths as possible to try and maximize the chance of restoration in the event that the transponder or MUX structure of the network is not colorless. Path Length Assignment attempts to separate short paths to one portion of the available wavelengths and long paths to another portion. The concept is that short paths will more easily fit together and be less fragmented, whereas long paths will have more wavelengths available to them without concern for a short path getting in the way and blocking it.

These conventional algorithms have advantages and disadvantages depending on the design of the network. For example, for colorless applications, where wavelengths can be reassigned, the most packing is generally desired to fit more services. For networks with regenerators or wavelength convertors, it may be possible to select a new wavelength at a blocking point to avoid contention at a distant point along the path. When routing takes place independently from wavelength assignment, a network may be analyzed by hand or machine to attempt to determine which algorithm works best for a given network. However, it may be possible to achieve less blocking and better network utilization if routing and wavelength assignment algorithms were to be combined. It may also be advantageous if some algorithms which are path length or neighbor based were to be used in conjunction with other algorithms which use independent criteria for their costs.

Accordingly, there is a need for improved methods, systems, and other techniques for routing and wavelength assignment in optical communications networks.

SUMMARY

Example embodiments of the invention are directed to systems and methods for routing and wavelength assignment in optical communications networks.

In some embodiments, a method is provided for facilitating routing and wavelength assignment in an optical communications network having a given topology of associated nodes and links. The method may comprise, for example: determining a set of system characteristics associated with operating the optical communications network based on the topology of associated nodes and links; selecting a first set of values for one or more parameters of a routing and wavelength assignment algorithm defined for operating a set of services on the optical communications network; determining a first set of routes and wavelengths assigned to the set of services via the assignment algorithm in accordance with the first set of values and the set of system characteristics; selecting a second set of values for the one or more parameters of the routing and wavelength assignment algorithm; determining a second set of routes and wavelengths assigned to the set of services via the assignment algorithm based on the second set of values and the set of system characteristics; comparing the first set of routes and wavelengths assigned to the set of services to the second set of routes and wavelengths assigned to the set of services based on one or more fitness criteria; selecting between the first and second sets of values based on the comparison; and provisioning a path computation engine of the optical communications network with the selected set of values for the one or more parameters to facilitate performing run-time routing and wavelength assignment operations by the path computation engine.

In other embodiments, an apparatus is provided for facilitating routing and wavelength assignment in an optical communications network having a given topology of associated nodes and links. The apparatus may comprise, for example: logic configured to determine a set of system characteristics associated with operating the optical communications network based on the topology of associated nodes and links; logic configured to select a first set of values for one or more parameters of a routing and wavelength assignment algorithm defined for operating a set of services on the optical communications network; logic configured to determine a first set of routes and wavelengths assigned to the set of services via the assignment algorithm in accordance with the first set of values and the set of system characteristics; logic configured to select a second set of values for the one or more parameters of the routing and wavelength assignment algorithm; logic configured to determine a second set of routes and wavelengths assigned to the set of services via the assignment algorithm based on the second set of values and the set of system characteristics; logic configured to compare the first set of routes and wavelengths assigned to the set of services to the second set of routes and wavelengths assigned to the set of services based on one or more fitness criteria; logic configured to select between the first and second sets of values based on the comparison; and logic configured to provision a path computation engine of the optical communications network with the selected set of values for the one or more parameters to facilitate performing run-time routing and wavelength assignment operations by the path computation engine.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. The term "embodiments of the invention" does not require that all embodiments of the invention include the discussed feature, advantage, or mode of operation, and alternate embodiments may be devised without departing from the scope of the invention. Additionally, well-known elements of the invention may not be described in detail or may be omitted so as not to obscure more relevant details of the invention.

The terminology used herein is for the purpose of describing particular embodiments only and is not intended to be limiting of all embodiments of the invention. As used herein, the singular forms "a," "an," and "the" are intended to include the plural forms as well, unless the context clearly indicates otherwise. It will be further understood that the terms "comprise," "comprising," "include," and/or "including," when used herein, specify the presence of stated features, integers, steps, operations, elements, and/or components, but do not preclude the presence or addition of one or more other features, integers, steps, operations, elements, components, and/or groups thereof.

Figure 1:
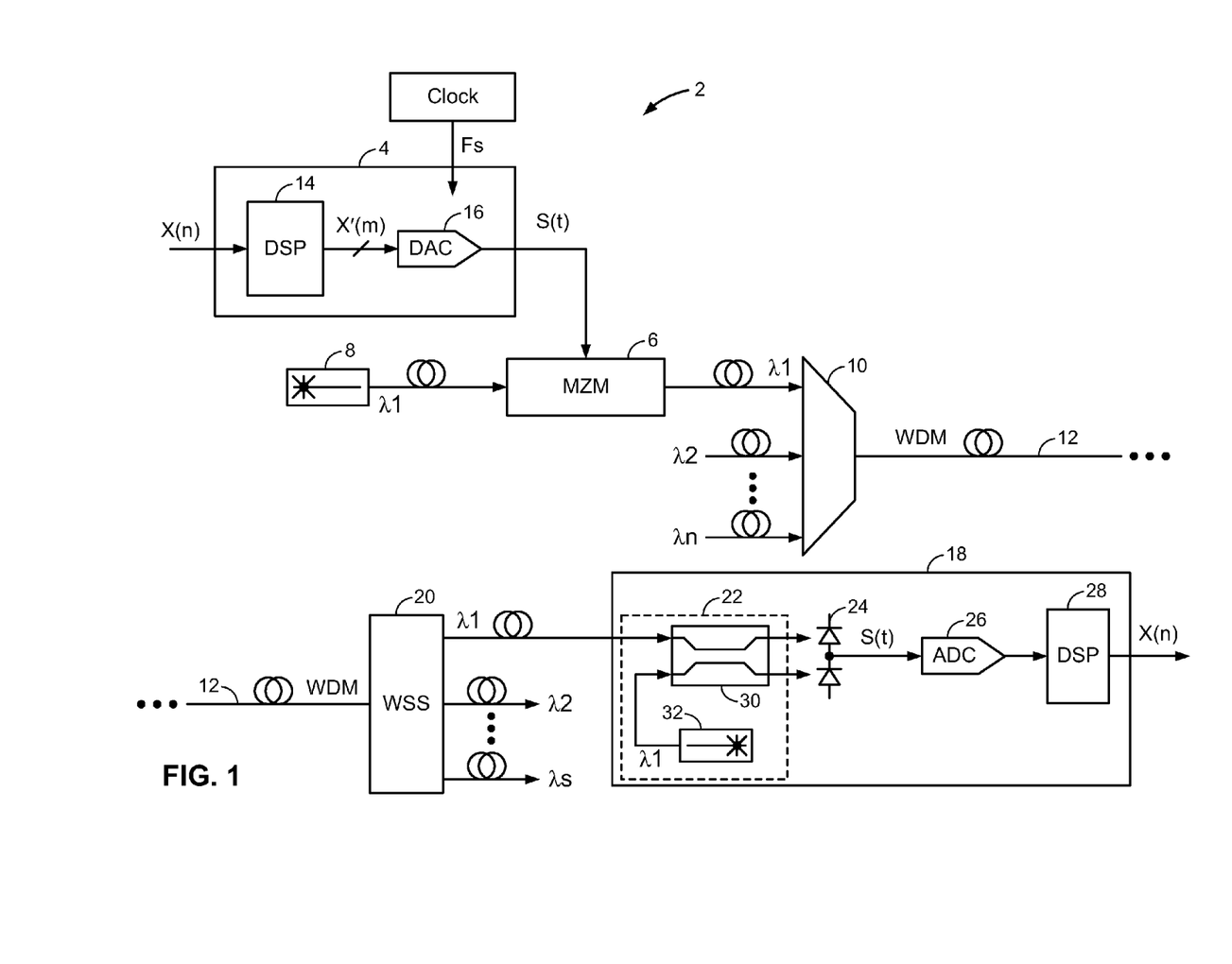
FIG. 1 illustrates optical communication between example nodes in an optical communications network.

FIG. 1 illustrates optical communication between example nodes in an optical communications network. The illustrated optical communication is between a source node 2 and a destination node 18, coupled together by an optical fiber link 12. As shown, the source node 2 typically comprises a signal generator 4 for converting a digital signal X(n) to be transmitted into a drive signal S(t) which drives a modulator 6 (e.g., a Mach-Zehnder Modulator (MZM)). The modulator 6 modulates a narrow-band optical carrier, generated by a laser 8 tuned to a predetermined center wavelength λ1 (among other center wavelengths λ2 to λn), to generate a corresponding optical channel signal. The resultant signal may then be multiplexed by a MUX 10 into a Wavelength Division Multiplexed (WDM) signal for transmission through the optical fiber link 12 to the destination node 18. Typically, the drive signal S(t) is a radio frequency (RF) analog electrical signal. In such cases, the signal generator 4 may include a Digital Signal Processor (DSP) 14 cascaded with a Digital-to-Analog Converter (DAC) 16. The DSP 14 operates to process the digital signal X(n) to generate a corresponding digital drive signal X'(m), which is designed in accordance with the performance and operating requirements of the DAC 16. The DAC 16 converts the digital drive signal X'(m) into the required analog RF drive signal S(t) for modulation onto the optical carrier.

The optical channel signal can be demultiplexed and routed through the optical communications network using filter based DeMUX devices or Wavelength Selective Switches (WSSs) known in the art. For illustration purposes, the destination node 18 is shown as coupled to a drop port of a WSS 20, which couples the channel signal from of an inbound WDM signal to the destination node 18. The destination node 18 comprises an optical front end 22 for supplying the optical channel signal to a photodetector block 24, which detects the incoming optical channel signal and generates an electrical photodetector current containing spectral components corresponding to the high-speed signal S(t). The photodetector current is then sampled by an Analog-to-Digital Converter (ADC) 26 and processed by a corresponding DSP 28 in the destination node 18 using various digital signal processing techniques to recover the original digital signal X(n). In the design of FIG. 1, the optical front end 22 is provided by a mixer 30, which combines the incoming optical channel signal with a narrow-band light generated by a local laser 32 tuned to the center wavelength λ1 of the optical channel signal. This arrangement may be used to enable coherent detection of the optical channel signal. However, other arrangements, such as well known direct detection techniques, may also be used.

Figure 2:
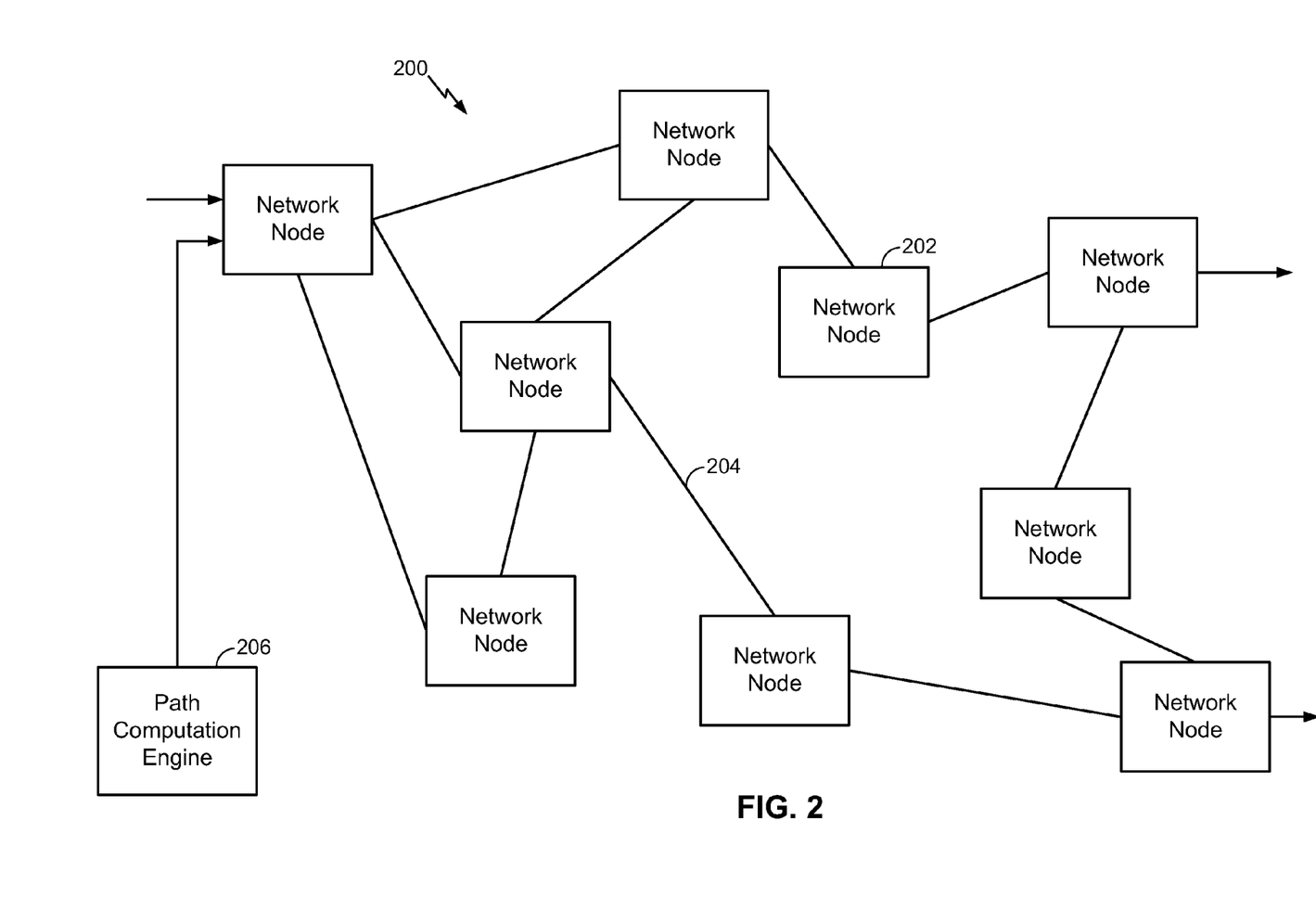
FIG. 2 illustrates an overview of an example network topology in which network nodes such as the ones shown in FIG. 1 may be deployed.

FIG. 2 illustrates an overview of an example network topology in which network nodes such as the ones shown in FIG. 1 may be deployed. For simplicity, the network 200 is shown as generally including several network nodes 202 coupled together by links 204 in different configurations. It will be appreciated that the various nodes 202 and links 204 may correspond to various entities and signal paths as known in the art. As discussed in the background above, such network topologies may be rather large and complex, making routing and wavelength assignment difficult but increasingly important. Accordingly, as is further illustrated in FIG. 2, the network 200 may further include a path computation engine 206, which may be part of a larger network management system (not shown). The path computation engine 206 is configured to perform routing and wavelength assignment functions to support a set of services that may be utilizing the network 200 at any given time. Conventional path computation engines, however, have been heretofore provisioned with limited and inflexible routing and wavelength assignment algorithms designed to minimize the cost of a single parameter (typically number of hops or latency).

Figure 3:
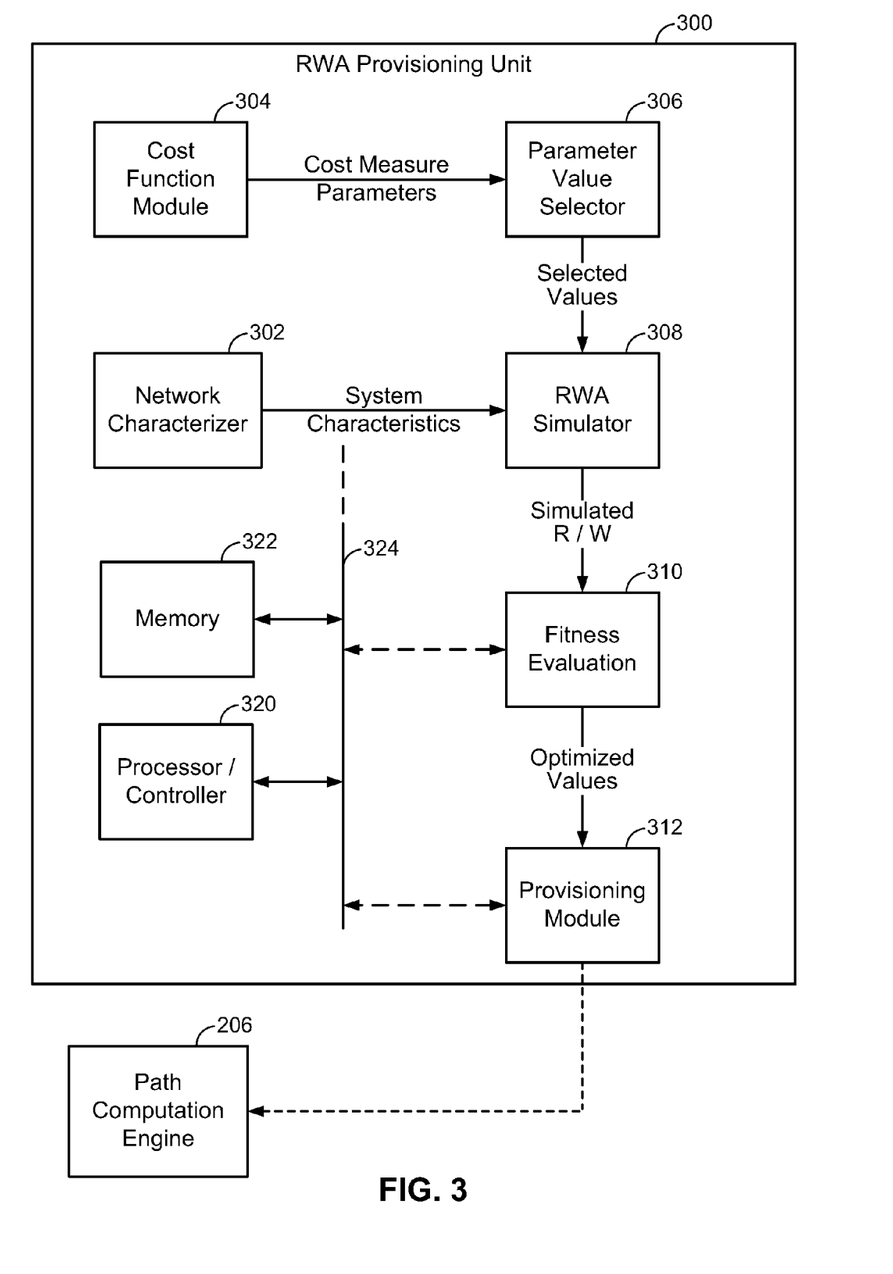
FIG. 3 illustrates an example routing and wavelength assignment (RWA) provisioning unit for generating flexible, parameterized RWA algorithms tailored to a given optical communications network according to various embodiments herein.

FIG. 3 illustrates an example routing and wavelength assignment (RWA) provisioning unit for generating flexible, parameterized RWA algorithms tailored to a given optical communications network according to various embodiments herein. The RWA provisioning unit 300 allows a planned or deployed network having a given topology of associated nodes and links to be modeled and simulated, and provides for the fine tuning of a comprehensive RWA algorithm in which a variety of parameters may be adjusted to maximize certain "fitness" criteria. The resultant RWA algorithm is therefore customized to the network on which it is to be provisioned, improving performance and capacity, and reducing the deployment of extra equipment.

As shown, the RWA provisioning unit 300 includes a network characterizer 302 configured to determine a set of system characteristics associated with operating a given optical communications network (such as the network 200 shown in FIG. 2) based on the network's topology and related system information as appropriate. The system information may be captured and modeled in a form suitable for further processing by the RWA provisioning unit 300 as required (e.g., in a graph representation of the network topology). The network characterizer 302 may have the system information preloaded and stored in memory (e.g., as received from another entity or component), or may extract it directly by querying the network for any required data.

Examples of system characteristics that may be determined for the network include node identifiers, links between nodes, latency of the links, administrative weights of the links, muxing technology information (e.g., gridless or gridded, colored or colorless), service requirements (e.g., protected or unprotected or mesh-restorable), the number of available transmitters/receivers at each node, the current set of services, internal photonic cross connect blocking states, transmitter/receiver properties (e.g., channel width, tunability), the placement of regenerator equipment, the current RWA algorithm provisioning, and so on.

The comprehensive RWA algorithm and its constituent components to be tailored and defined for operating a set of services on the optical communications network being provisioned may be stored in a cost function module 304 (e.g., a memory module). The components may include one or more cost function measures directed to different aspects of network activity. The relative importance of each measure may be adjusted (e.g., emphasized or deemphasized) via one or more associated parameters to better fit the network's determined system characteristics as provided by the network characterizer 302. Several example cost function measures and their associated parameters are described below.

One example cost function measure relates to the most used/least used wavelengths and a degree to which the RWA algorithm favors higher use of a given wavelength in the optical communications network as compared to lower use of the given wavelength. In order to avoid wavelength contention in a colorless system, it may be desirable to assign wavelengths that are not used in the system. Conversely, in order to efficiently pack services into the smallest number of wavelengths, it may be necessary to assign wavelengths that are used most in the system. To control this balance, a Wavelength Usage (WAVEUSE) parameter may be introduced. The use of the WAVEUSE parameter may be characterized, for example, as follows:

$$Cost_{WaveUse} = \left(\frac{\text{Number of Links using Wavelength}}{\text{Number of Links}}\right) \times \text{WAVEUSE} \quad \text{Eq. (1)}$$

In this formulation, when WAVEUSE is 0, there is no cost adjustment based on the fraction of links that use a given wavelength. When WAVEUSE is selected to be positive, the cost of a wavelength is increased the more it is used. This favors selection of least used wavelengths. When WAVEUSE is selected to be negative, the cost of a wavelength is decreased the more it is used. This favors selection of most used wavelengths.

Another example cost function measure relates to path length separation and a degree to which the RWA algorithm favors segregating shorter paths in the optical communications network from longer paths. A Path Length (PATHLEN) parameter may accordingly be used to control the degree to which short paths are segregated from long paths in the network. This may be used to further separate wavelengths to avoid collisions or to push wavelengths to one side of the spectrum or another. The PATHLEN parameter is introduced to define the distinction between what is considered a short path as compared to a long path. The length of a path may then be compared to the PATHLEN and a factor may be computed for each wavelength based on the path length, such as according to the following:

$$Cost_{PathLen}[\text{wavelength}] = \quad \text{Eq. (2)}$$
$$(Length_{Path} - PATHLEN) \times \left(\frac{\text{Max Wavelength}}{2} - \text{wavelength}\right) +$$
$$\text{ABS}(Length_{Path} - PATHLEN) \times \left(\frac{\text{Max Wavelength}}{2}\right)$$

In this way, the PATHLEN acts as a delimiter between what is defined as a "long" path and what is defined as a "short" path. If PATHLEN is 0, all paths are treated as long paths, and are allocated from the higher wavelengths to the lower wavelengths. If PATHLEN is greater than or equal to the maximum path length possible, all paths are treated as short paths, and all wavelengths are assigned from the smallest to the largest. If the PATHLEN is anywhere in between, it defines if a path is considered short or long, with shorter paths being assigned from the smaller wavelengths first and longer paths being assigned from the higher wavelengths first, separating them.

Another example cost function measure relates to neighbor cost and a degree to which the RWA algorithm favors a path that maximizes a number of neighboring nodes and minimizes gaps adjacent to the path. In order to encourage minimal fragmentation of the network, part of the RWA algorithm may attempt to minimize gaps adjacent to the selected path. A Neighbor (NEIGHBOR) parameter may be constructed to prefer paths which maximize neighbors (and hence minimize gaps). In one example, to quantitatively measure the neighbor factor, the number of times a wavelength is used on neighboring links at the head end and tail end of a service may be counted, excluding the links associated with the path in question, and normalized on the number of links on the ends. This count on a per wavelength basis may then be multiplied by the NEIGHBOR factor to determine the effect of this factor on the path and wavelength selection, such as according to the following:

$$Cost_{Neighbor}[\text{wavelength}] = \frac{Count_{used}[\text{wavelength}]}{NumberNeighbors} \times \text{NEIGHBOR} \quad \text{Eq. (3)}$$

Another example cost function measure relates to most used/least used routing and a degree to which the RWA algorithm favors higher loading of a given link in the optical communications network as compared to lower loading of the given link. A factor in routing decisions that affects paths that channels may take through a variably loaded network is the adjustment of the cost of each link based on how occupied it is. A Link Usage (LINKUSE) parameter may be defined to adjust the cost of a link based on its usage. It may used, for example, as follows:

$$Cost_{Adjusted} = Cost * \text{LINKUSE}\left(\frac{\text{Wavelengths Used}}{\text{Wavelength Capacity}}\right) \quad \text{Eq. (4)}$$

Here, when the LINKUSE factor is selected to be 1, the adjusted cost is equal to the original cost. When the LINKUSE factor is selected to be between 0 and 1, the adjusted cost of the link is less than the original cost. This allows paths to favor links which are less occupied. When the LINKUSE factor is selected to be over 1, the adjusted cost of the link is greater than the original cost. This allows paths to favor links which are more occupied.

Another example cost function measure relates to wavelength detour and a degree to which the RWA algorithm favors rerouting a lower cost path to a higher cost path based on the higher cost path having a lower cost wavelength. In order to combine routing assignment aspects with wavelength assignment aspects, alternate paths may be made selectable when those paths would have had a lower cost but for selection of the optimal wavelength. For example, a path which had a higher cost may nevertheless be preferred because it better meets wavelength assignment criteria. In some networks and under some criteria, this may not be a desired choice since it may force a longer path with a higher latency or hop count. The cost of a detour based on the wavelength cost may accordingly be adjusted using a Detour (DETOUR) parameter. The DETOUR parameter may be multiplied with the lowest minimal wavelength cost for each path, for example, and subsequently added to the total cost of a path before selection is made:

$$Cost_{path} = Cost_{path} + \text{WavelengthCost}_{Min} \times \text{DETOUR} \quad \text{Eq. (5)}$$

Here, if DETOUR is selected to be 0, paths are not penalized if they have a higher wavelength cost. The lowest cost path is selected. If DETOUR is selected to be greater than 0, the amount of cost added scales linearly.

Another example cost function measure relates to spectral gap avoidance and a degree to which the RWA algorithm favors closer spectral spacing of assigned wavelengths in the optical communications network as compared to more spread out spectral spacing of the assigned wavelengths. When using gridded equipment, wavelength assignment need not concern itself with varying widths of channels, and the minimal wavelength width available is equal to the width of the service being assigned. When gridless equipment is used, however, the width of the channel being assigned may be larger than any given portion of the spectrum available for assignment. Further, assignment of a wavelength in the middle of an available portion of the spectrum may fragment the spectrum and make the remaining portions of the spectrum unavailable for service whose widths are larger than the available widths. It may therefore be desirable to avoid gaps in the spectrum in a gridless system.

In order to avoid spectral gaps, a cost may be assigned to available bandwidth based on how large of a gap it would produce on either side if a certain width is provisioned at that location in the spectrum. This may be achieved by using a Spectral Gap (SPECTRALGAP) parameter defined, for example, as follows:

$$Cost_{Wavelength} = \text{SPECTRALGAP} * (\text{GAPSIZE}_{Lower} + \text{GAPSIZE}_{Upper}) \quad \text{Eq. (6)}$$

Here, when SPECTRALGAP is selected to be less than 0, assignment of wavelengths prefer spectrum away from existing channels. When SPECTRALGAP is selected to be greater than 0, gaps to either side of a specific wavelength result in a higher cost, and assignment prefers spectrum adjacent to an existing channel, minimizing spectral gaps.

It will be appreciated that other cost function measures may be employed as desired, and that the various cost function measures may be combined in a variety of configurations and a variety of ways (e.g., simple addition) to form the basis for the comprehensive RWA algorithm to be tailored by way of its constituent parameters to the network being provisioned.

Returning to FIG. 3, the RWA provisioning unit 300 further includes a parameter value selection unit 306 configured to select for evaluation different sets of values for the parameters of the RWA algorithm maintained by the cost function module 304. An RWA simulator 308 is configured to test the different parameter values by determining routes and wavelengths (R/W) that would be assigned to one or more sets of services via the RWA assignment algorithm in accordance with the selected parameter values and the set of system characteristics provided by the network characterizer 302. A fitness evaluation unit 310 may then compare the different sets of routes and wavelengths assigned to the set of services by the RWA simulator 308 based on certain fitness criteria relating to desired network performance, and select which set of parameter values better optimizes the RWA assignment algorithm for that particular network.

For example, the parameter value selection unit 306 may select a first set of values for one or more parameters of the RWA algorithm and the RWA simulator 308 may determine a first set of routes and wavelengths assigned to a set of services via the RWA algorithm in accordance with the first set of values and the set of system characteristics for the network. The parameter value selection unit 306 may then select a second set of values for the one or more parameters of the RWA algorithm and the RWA simulator 308 may determine a second set of routes and wavelengths assigned to the set of services via the assignment algorithm based on the second set of values and the set of system characteristics. The two sets of routes and wavelengths assigned to the set of services will be different due to the different parameter values used to assign them and will accordingly provide varying levels of performance. The fitness evaluation unit 310 may then compare the first set of routes and wavelengths assigned to the set of services to the second set of routes and wavelengths assigned to the set of services based on one or more fitness criteria (e.g., as specified by a system designer or customer), and select between the first and second sets of values based on the comparison.

The network's path computation engine (e.g., the path computation engine 206 described above with reference to FIG. 2) may then be provisioned by a provisioning module 312 with the selected set of values for the one or more parameters to facilitate performing run-time routing and wavelength assignment operations by the path computation engine. It will be appreciated that the RWA provisioning unit 300 may also include one or more general purpose controllers or processors (illustrated in the singular as the controller/processor 320) and memory 322 configured to store related data or instructions. Together, via a bus 324, these units may perform processing in accordance with any of the other illustrated components, according to various embodiments, and may in some embodiments entirely replace or encompass one or more of the other illustrated components.

Parameter value selection and evaluation may be performed in a variety of ways to generate optimized values for the resultant RWA algorithm for a given optical communications network. For example, an iterative "genetic" selection algorithm may be employed whereby initial seed values for the one or more parameters are evaluated and shuffled through multiple generations to arrive at a stable set of optimal values. An example selection algorithm of this type is described below in more detail.

Figure 4:
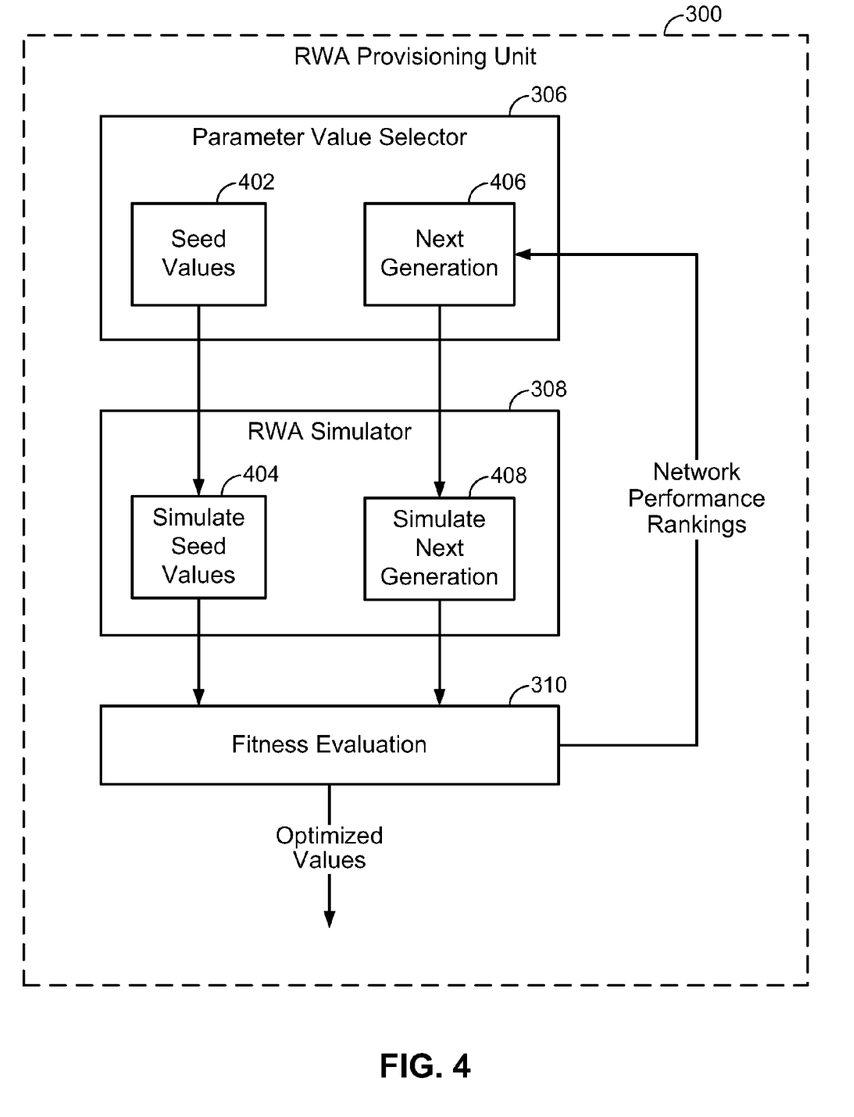
FIG. 4 illustrates an example iterative genetic selection design of the RWA provisioning unit of FIG. 3 for parameter value selection and evaluation according to an example embodiment.

FIG. 4 illustrates an example iterative genetic selection design of the RWA provisioning unit of FIG. 3 for parameter value selection and evaluation according to an example embodiment. In this example, an initial generation of seed parameter values 402 is selected and may contain only randomly or pseudo randomly generated settings, designed to represent a wide sampling of possible combinations. It may also contain an initial seed population of certain baseline settings of the parameterized RWA algorithm selected to emulate one or more conventional routing or wavelength assignment algorithms (e.g., First Fit, Most Used Links, Least Used Links, Most Used Wavelengths, or Least Used Wavelengths algorithms discussed above).

This initial generation may be accordingly simulated 404 by the RWA simulator 308 to determine routes and wavelengths that would be assigned to a set of services via the RWA assignment algorithm in accordance with the initial parameter values and the set of system characteristics provided by the network characterizer 302 (not shown in FIG. 4). The fitness evaluation unit 310 may then compare the performance of different sets of routes and wavelengths assigned to the set of services by the RWA simulator 308 based on certain fitness criteria. The performance of each set of parameter values may be ranked and fed back to the parameter value selector 306 to aid in selecting the next generation of parameter values 406. In this way, the best performing parameter values may be retained and reintroduced into the next generation (e.g., though shuffling among the surviving sets) for subsequent next generation simulation 408. This procedure may be repeated over several generations until a stable population of parameter values is achieved or some other end criteria are reached. In some embodiments, a number of generations may be tested by filling the network with services, and optionally testing at regular intervals for the possibility of successful mesh-restoration of all services. Once all actors have been tested, the generation may be ranked according to the fitness criteria, and the most successful portion (e.g., 30%) of the generation may be selected for breeding to produce the next generation.

Child generations may be created by selecting two parent sets of values from the available pool, and randomly selecting the raw parameter value from one parent or the other, or taking the average of the two parents. In some embodiments, a random mutation may be applied to a randomized subset of the child population, in which one parameter is completely replaced by a random value. Dithering may also be applied to a random subset of the child population in which all parameters are varied by a small amount (e.g., by 10% or less) to avoid stagnation. In some embodiments, the parent generations may also be carried forward to the next generation to compete with their offspring. In every generation, a small portion (e.g., 10%) of the generation may also be replaced with a randomized set of immigrant values injected into the environment in order to add an element of randomness and rough mutations. This newly constructed generation may be tested in the same way, and the convergence compared against the reference baselines.

The fitness criteria used for the evaluation may be selected based on desired network performance metrics for a given optical communications network, and may vary on a network-to-network basis depending on particular customer, system designer, or other requirements. Accordingly, there are a variety of fitness criteria which may be applied to select for the best parameters settings for any given network.

One example fitness criterion is a maximum number of services criterion relating to a number of services that the RWA algorithm is able to serve on the optical communications network in accordance with a given set of values for the one or more parameters. In the context of the genetic selection algorithm example above, this criterion may used to find the genomes in the generation that result in the most services that can be accommodated in the network for a set of requested services. The different parameter value settings can be tested, for example, for strictly the maximum number of services that can be fit or for the maximum number of mesh restorable services (in which successful mesh restoration of all services due to failures on all links is periodically tested), in either a colorless network (in which the restoration path may use a different wavelength than the home path) or a colored network (in which the restoration path must use the same wavelength).

Another example fitness criterion is a minimum blocking probability criterion relating to a probability that the RWA algorithm is able to restore a given service to an alternate path in the optical communications network in accordance with a given set of values for the one or more parameters. If a network is designed to support a fixed number of services and there is no requirement to support more, it may be desirable to optimize the network and path computations to maximize the probability that a service can be restored to an alternate path. The blocking probability of a service can be calculated based on the number of available paths and wavelengths that can support that service. This is likely to provide a user with the most reliable services at a small latency penalty due to the longer paths that services may take in order to better pack the network and minimize fragmentation.

Another example fitness criterion is a minimum latency criterion relating to an average latency that the RWA algorithm is able to accommodate for a given service in the optical communications network in accordance with a given set of values for the one or more parameters. In the context of the genetic selection algorithm example above, this criterion may used to find the genomes in the generation that result in the lowest average latency that can be accommodated in the network for a set of requested services. This criterion may in effect lower the total number of services that can be supported on a given network, since it selects against genomes that reroute services to longer paths, but tends to better pack them into the network.

Other fitness criteria may also be employed as desired for a given application. Further, the fitness criteria may be selected individually or as part of a relative weighting scheme (e.g., a weighting scheme that gives more weight to one criterion over another while not completely ignoring secondary network considerations). For example, it may be desirable to select for the maximum number of services, but to rank low latency as a secondary criterion. Alternatively, it may be desirable to place constraints on metrics such as latency or path diversity so that services are maximized, but to place a limit on paths that would exceed that constraint.

Figure 5:
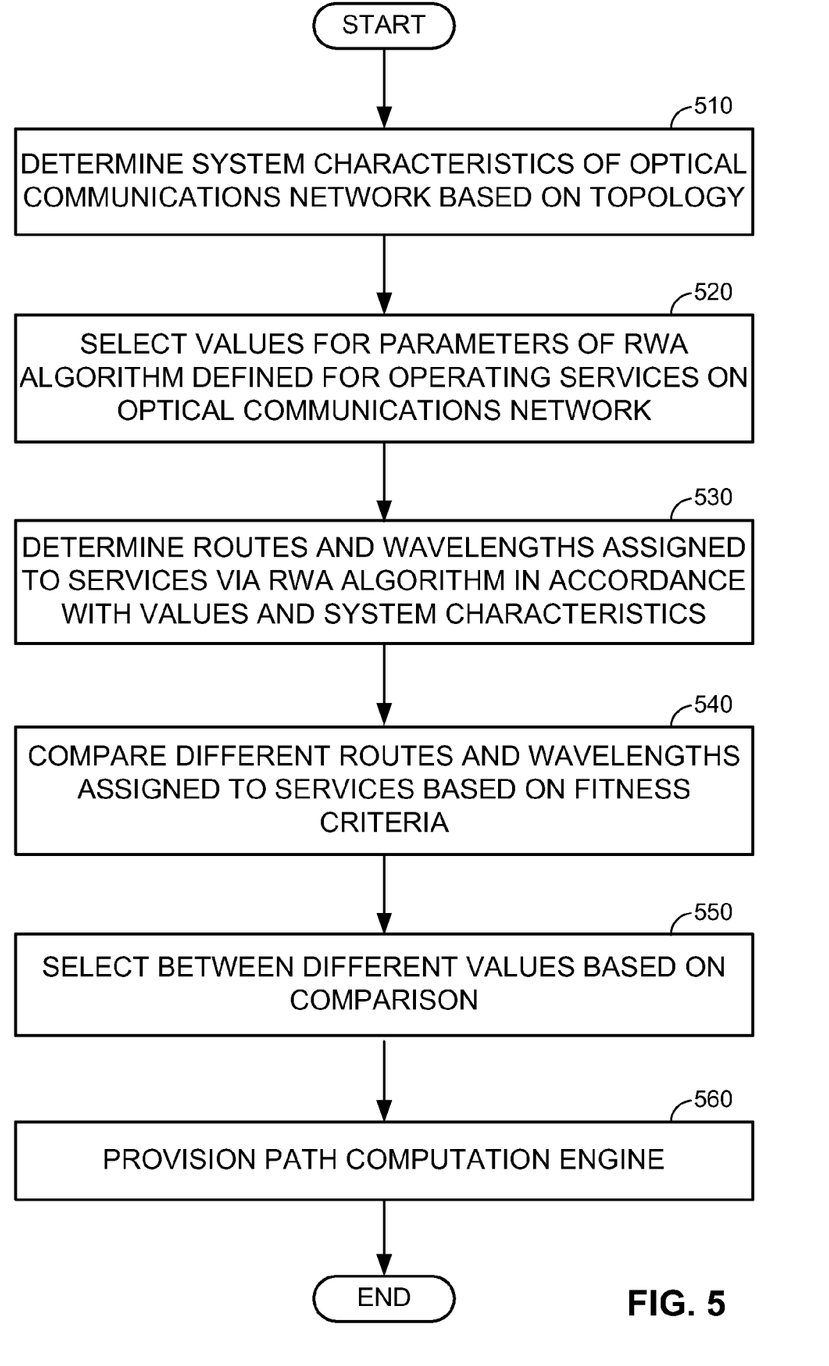
FIG. 5 is a flow diagram illustrating an example method for facilitating routing and wavelength assignment in an optical communications network having a given topology of associated nodes and links according to various embodiments.

FIG. 5 is a flow diagram illustrating an example method for facilitating routing and wavelength assignment in an optical communications network having a given topology of associated nodes and links according to various embodiments. As shown, a set of system characteristics associated with operating the optical communications network may be determined based on the topology of associated nodes and links (block 510). Different sets of values (e.g., a first set and a second set) may be selected for one or more parameters of an RWA algorithm defined for operating a set of services on the optical communications network (block 520), and associated sets of routes and wavelengths (e.g., a corresponding first set and a corresponding second set) that may be assigned to the different sets of services via the RWA algorithm in accordance with their respective sets of values and the set of system characteristics may then be determined (block 530). The different sets of routes and wavelengths assigned to the set of services may be compared based on one or more fitness criteria (block 540), and selected between based on the comparison (block 550). A path computation engine of the optical communications network (e.g., the path computation engine 206 described above) may then be provisioned with the selected set of values for the one or more parameters to facilitate performing run-time routing and wavelength assignment operations by the path computation engine (block 560).

As discussed in more detail above, the set of system characteristics may include a node identifier associated with the nodes, a list of the links between the nodes, latency of the links, administrative weights of the links, muxing technology information, service requirements, a number of available transmitters or receivers at each node, a current set of services, internal photonic cross connect blocking states, transmitter or receiver properties, placement of regenerator equipment, a current RWA algorithm provisioned in the path computation engine, and so on. The one or more parameters may be associated with a cost function for evaluating relative performance of different sets of routes and wavelengths assigned to the set of services, such as a wavelength usage parameter relating to a degree to which the RWA algorithm favors higher use of a given wavelength in the optical communications network as compared to lower use of the given wavelength, a path length parameter relating to a degree to which the RWA algorithm favors segregating shorter paths in the optical communications network from longer paths, a neighbor cost parameter relating to a degree to which the RWA algorithm favors a path that maximizes a number of neighboring nodes and minimizes gaps adjacent to the path, a link usage parameter relating to a degree to which the RWA algorithm favors higher loading of a given link in the optical communications network as compared to lower loading of the given link, a wavelength detour parameter relating to a degree to which the RWA algorithm favors rerouting a lower cost path to a higher cost path based on the higher cost path having a lower cost wavelength, a spectral gap parameter relating to a degree to which the RWA algorithm favors closer spectral spacing of assigned wavelengths in the optical communications network as compared to more spread out spectral spacing of the assigned wavelengths, and so on. In some embodiments, the one or more parameters may include a combination of the wavelength usage, path length, neighbor cost, link usage, wavelength detour, and/or spectral gap parameters.

As also discussed above in more detail, the one or more fitness criteria may include a maximum number of services criterion relating to a number of services that the RWA algorithm is able to serve on the optical communications network in accordance with a given set of values for the one or more parameters, a minimum blocking probability criterion relating to a probability that the RWA algorithm is able to restore a given service to an alternate path in the optical communications network in accordance with a given set of values for the one or more parameters, a minimum latency criterion relating to an average latency that the RWA algorithm is able to accommodate for a given service in the optical communications network in accordance with a given set of values for the one or more parameters, and so on. In some embodiments, the one or more fitness criteria may include a combination of the maximum number of services, minimum blocking probability, and/or minimum latency criteria. When used in combination, the fitness criteria may be combined according to a relative weighting scheme that gives more weight to one fitness criterion as compared to another fitness criterion.

In some embodiments, the method may further include iterative operations for utilizing parent generations to select child generations of parameter value sets. For example, the method may further include selecting a third set of values (e.g., a parent set of values) for the one or more parameters of the RWA algorithm, determining a third set of routes and wavelengths assigned to the set of services via the RWA algorithm based on the third set of values and the set of system characteristics, selecting a fourth set of values (e.g., another parent set of values) for the one or more parameters of the RWA algorithm, determining a fourth set of routes and wavelengths assigned to the set of services via the RWA algorithm based on the fourth set of values and the set of system characteristics, and comparing the third set of routes and wavelengths assigned to the set of services to the fourth set of routes and wavelengths assigned to the set of services based on the one or more fitness criteria. In this way, selecting the first set of values may include selecting at least one value for the first (child) set of values from the third (parent) set of values and selecting at least one other value for the first (child) set of values from the fourth (parent) set of values based on the comparison between the third set of routes and wavelengths assigned to the set of services and the fourth set of routes and wavelengths assigned to the set of services, and selecting the second set of values may similarly include selecting at least one value for the second (child) set of values from the third (parent) set of values and selecting at least one other value for the second (child) set of values from the fourth (parent) set of values based on the comparison between the third set of routes and wavelengths assigned to the set of services and the fourth set of routes and wavelengths assigned to the set of services.

In still further embodiments, the iterative operations may include variations to introduce immigrant parameter value sets. For example, a fifth set of values (e.g., an immigrant set of values) for the one or more parameters of the RWA algorithm may be selected, such as randomly or pseudo randomly, and a fifth set of routes and wavelengths that may be assigned to the set of services via the RWA algorithm based on the fifth set of values and the set of system characteristics may be determined. In this way, comparing the first set of routes and wavelengths assigned to the set of services to the second set of routes and wavelengths assigned to the set of services may include comparing to each other the first (child) set of routes and wavelengths assigned to the set of services, the second (child) set of routes and wavelengths assigned to the set of services, the third (parent) set of routes and wavelengths assigned to the set of services (and/or the fourth (parent) set of routes and wavelengths assigned to the set of services), and the fifth (immigrant) set of routes and wavelengths assigned to the set of services based on the one or more fitness criteria. Selecting between the first and second sets of values may accordingly include selecting between the first, second, third (and/or fourth), and fifth sets of values based on the comparison.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit.

Additionally, the various illustrative flow diagrams, logical blocks, modules and/or algorithm steps described herein may also be coded as computer-readable instructions carried on any computer-readable medium known in the art or implemented in any computer program product known in the art. Computer-readable media include both computer storage media and communication media including any medium that facilitates transfer of a computer program from one place to another. A storage medium may be any available medium that can be accessed by a computer. By way of example, and not limitation, such computer-readable media may include RAM, ROM, EEPROM, CD-ROM or other optical disc storage, magnetic disk storage or other magnetic storage devices, or any other medium that can be used to carry or store desired program code in the form of instructions or data structures and that can be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of a medium. Disk and disc, as used herein, include compact disc (CD), laser disc, optical disc, digital versatile disc (DVD), floppy disk and blu-ray disc, where disks usually reproduce data magnetically, and discs reproduce data optically with lasers. Combinations of the above should also be included within the scope of computer-readable media.

The forgoing description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

The invention claimed is:

1. A method for facilitating routing and wavelength assignment in an optical communications network having a given topology of associated nodes and links, the method comprising:
    determining a set of system characteristics associated with operating the optical communications network based on the topology of associated nodes and links;
    selecting a first set of values for one or more parameters of a routing and wavelength assignment algorithm defined for operating a set of services on the optical communications network;
    determining a first set of routes and wavelengths assigned to the set of services via the assignment algorithm in accordance with the first set of values and the set of system characteristics;
    selecting a second set of values for the one or more parameters of the routing and wavelength assignment algorithm;
    determining a second set of routes and wavelengths assigned to the set of services via the assignment algorithm based on the second set of values and the set of system characteristics;
    comparing the first set of routes and wavelengths assigned to the set of services to the second set of routes and wavelengths assigned to the set of services based on one or more fitness criteria;
    selecting between the first and second sets of values based on the comparison; and
    provisioning a path computation engine of the optical communications network with the selected set of values for the one or more parameters to facilitate performing runtime routing and wavelength assignment operations by the path computation engine.

2. The method of claim 1, wherein the set of system characteristics comprises at least one of a node identifier associated with the nodes, a list of the links between the nodes, latency of the links, administrative weights of the links, muxing technology information, service requirements, a number of available transmitters or receivers at each node, a current set of services, internal photonic cross connect blocking states, transmitter or receiver properties, placement of regenerator equipment, or a current routing and wavelength assignment algorithm provisioned in the path computation engine.

3. The method of claim 1, wherein the one or more parameters are associated with a cost function for evaluating relative performance of different sets of routes and wavelengths assigned to the set of services.

4. The method of claim 3, wherein the one or more parameters comprise at least one of:
   a wavelength usage parameter relating to a degree to which the assignment algorithm favors higher use of a given wavelength in the optical communications network as compared to lower use of the given wavelength;
   a path length parameter relating to a degree to which the assignment algorithm favors segregating shorter paths in the optical communications network from longer paths;
   a neighbor cost parameter relating to a degree to which the assignment algorithm favors a path that maximizes a number of neighboring nodes and minimizes gaps adjacent to the path;
   a link usage parameter relating to a degree to which the assignment algorithm favors higher loading of a given link in the optical communications network as compared to lower loading of the given link;
   a wavelength detour parameter relating to a degree to which the assignment algorithm favors rerouting a lower cost path to a higher cost path based on the higher cost path having a lower cost wavelength; or
   a spectral gap parameter relating to a degree to which the assignment algorithm favors closer spectral spacing of assigned wavelengths in the optical communications network as compared to more spread out spectral spacing of the assigned wavelengths.

5. The method of claim 4, wherein the one or more parameters comprise at least two of the wavelength usage, path length, neighbor cost, link usage, wavelength detour, or spectral gap parameters.

6. The method of claim 1, wherein the one or more fitness criteria comprise at least one of:
   a maximum number of services criterion relating to a number of services that the assignment algorithm is able to serve on the optical communications network in accordance with a given set of values for the one or more parameters;
   a minimum blocking probability criterion relating to a probability that the assignment algorithm is able to restore a given service to an alternate path in the optical communications network in accordance with a given set of values for the one or more parameters; or
   a minimum latency criterion relating to an average latency that the assignment algorithm is able to accommodate for a given service in the optical communications network in accordance with a given set of values for the one or more parameters.

7. The method of claim 6, wherein the one or more fitness criteria comprise at least two of the maximum number of services, minimum blocking probability, or minimum latency criteria.

8. The method of claim 7, wherein the at least two fitness criteria are combined according to a relative weighting scheme that gives more weight to one fitness criterion as compared to another fitness criterion.

9. The method of claim 1, further comprising:
   selecting a third set of values for the one or more parameters of the routing and wavelength assignment algorithm;
   determining a third set of routes and wavelengths assigned to the set of services via the assignment algorithm based on the third set of values and the set of system characteristics;
   selecting a fourth set of values for the one or more parameters of the routing and wavelength assignment algorithm;
   determining a fourth set of routes and wavelengths assigned to the set of services via the assignment algorithm based on the fourth set of values and the set of system characteristics; and
   comparing the third set of routes and wavelengths assigned to the set of services to the fourth set of routes and wavelengths assigned to the set of services based on the one or more fitness criteria,
   wherein selecting the first set of values comprises selecting at least one value for the first set of values from the third set of values and selecting at least one other value for the first set of values from the fourth set of values based on the comparison between the third set of routes and wavelengths assigned to the set of services and the fourth set of routes and wavelengths assigned to the set of services, and
   wherein selecting the second set of values comprises selecting at least one value for the second set of values from the third set of values and selecting at least one other value for the second set of values from the fourth set of values based on the comparison between the third set of routes and wavelengths assigned to the set of services and the fourth set of routes and wavelengths assigned to the set of services.

10. The method of claim 9, further comprising:
    selecting a fifth set of values for the one or more parameters of the routing and wavelength assignment algorithm, wherein the fifth set of values is selected randomly or pseudo randomly; and
    determining a fifth set of routes and wavelengths assigned to the set of services via the assignment algorithm based on the fifth set of values and the set of system characteristics,
    wherein comparing the first set of routes and wavelengths assigned to the set of services to the second set of routes and wavelengths assigned to the set of services comprises comparing to each other the first set of routes and wavelengths assigned to the set of services, the second set of routes and wavelengths assigned to the set of services, the third set of routes and wavelengths assigned to the set of services, and the fifth set of routes and wavelengths assigned to the set of services based on the one or more fitness criteria, and
    wherein selecting between the first and second sets of values comprises selecting between the first, second, third, and fifth sets of values based on the comparison.

11. An apparatus for facilitating routing and wavelength assignment in an optical communications network having a given topology of associated nodes and links, the apparatus comprising:
    logic configured to determine a set of system characteristics associated with operating the optical communications network based on the topology of associated nodes and links;
    logic configured to select a first set of values for one or more parameters of a routing and wavelength assignment algorithm defined for operating a set of services on the optical communications network;
    logic configured to determine a first set of routes and wavelengths assigned to the set of services via the assignment algorithm in accordance with the first set of values and the set of system characteristics;
    logic configured to select a second set of values for the one or more parameters of the routing and wavelength assignment algorithm;
    logic configured to determine a second set of routes and wavelengths assigned to the set of services via the assignment algorithm based on the second set of values and the set of system characteristics;

logic configured to compare the first set of routes and wavelengths assigned to the set of services to the second set of routes and wavelengths assigned to the set of services based on one or more fitness criteria;

logic configured to select between the first and second sets of values based on the comparison; and logic configured to provision a path computation engine of the optical communications network with the selected set of values for the one or more parameters to facilitate performing run-time routing and wavelength assignment operations by the path computation engine.

12. The apparatus of claim 11, wherein the set of system characteristics comprises at least one of a node identifier associated with the nodes, a list of the links between the nodes, latency of the links, administrative weights of the links, muxing technology information, service requirements, a number of available transmitters or receivers at each node, a current set of services, internal photonic cross connect blocking states, transmitter or receiver properties, placement of regenerator equipment, or a current routing and wavelength assignment algorithm provisioned in the path computation engine.

13. The apparatus of claim 11, wherein the one or more parameters are associated with a cost function for evaluating relative performance of different sets of routes and wavelengths assigned to the set of services.

14. The apparatus of claim 13, wherein the one or more parameters comprise at least one of:

a wavelength usage parameter relating to a degree to which the assignment algorithm favors higher use of a given wavelength in the optical communications network as compared to lower use of the given wavelength;

a path length parameter relating to a degree to which the assignment algorithm favors segregating shorter paths in the optical communications network from longer paths;

a neighbor cost parameter relating to a degree to which the assignment algorithm favors a path that maximizes a number of neighboring nodes and minimizes gaps adjacent to the path;

a link usage parameter relating to a degree to which the assignment algorithm favors higher loading of a given link in the optical communications network as compared to lower loading of the given link;

a wavelength detour parameter relating to a degree to which the assignment algorithm favors rerouting a lower cost path to a higher cost path based on the higher cost path having a lower cost wavelength; or a spectral gap parameter relating to a degree to which the assignment algorithm favors closer spectral spacing of assigned wavelengths in the optical communications network as compared to more spread out spectral spacing of the assigned wavelengths.

15. The apparatus of claim 14, wherein the one or more parameters comprise at least two of the wavelength usage, path length, neighbor cost, link usage, wavelength detour, or spectral gap parameters.

16. The apparatus of claim 11, wherein the one or more fitness criteria comprise at least one of:

a maximum number of services criterion relating to a number of services that the assignment algorithm is able to serve on the optical communications network in accordance with a given set of values for the one or more parameters;

a minimum blocking probability criterion relating to a probability that the assignment algorithm is able to restore a given service to an alternate path in the optical communications network in accordance with a given set of values for the one or more parameters; or a minimum latency criterion relating to an average latency that the assignment algorithm is able to accommodate for a given service in the optical communications network in accordance with a given set of values for the one or more parameters.

17. The apparatus of claim 16, wherein the one or more fitness criteria comprise at least two of the maximum number of services, minimum blocking probability, or minimum latency criteria.

18. The apparatus of claim 17, wherein the at least two fitness criteria are combined according to a relative weighting scheme that gives more weight to one fitness criterion as compared to another fitness criterion.

19. The apparatus of claim 11, further comprising:

logic configured to select a third set of values for the one or more parameters of the routing and wavelength assignment algorithm;

logic configured to determine a third set of routes and wavelengths assigned to the set of services via the assignment algorithm based on the third set of values and the set of system characteristics;

logic configured to select a fourth set of values for the one or more parameters of the routing and wavelength assignment algorithm;

logic configured to determine a fourth set of routes and wavelengths assigned to the set of services via the assignment algorithm based on the fourth set of values and the set of system characteristics; and logic configured to compare the third set of routes and wavelengths assigned to the set of services to the fourth set of routes and wavelengths assigned to the set of services based on the one or more fitness criteria, wherein the logic configured to select the first set of values comprises logic configured to select at least one value for the first set of values from the third set of values and logic configured to select at least one other value for the first set of values from the fourth set of values based on the comparison between the third set of routes and wavelengths assigned to the set of services and the fourth set of routes and wavelengths assigned to the set of services, and wherein the logic configured to select the second set of values comprises logic configured to select at least one value for the second set of values from the third set of values and logic configured to select at least one other value for the second set of values from the fourth set of values based on the comparison between the third set of routes and wavelengths assigned to the set of services and the fourth set of routes and wavelengths assigned to the set of services.

20. The apparatus of claim 19, further comprising:

logic configured to select a fifth set of values for the one or more parameters of the routing and wavelength assignment algorithm, wherein the fifth set of values is selected randomly or pseudo randomly; and logic configured to determine a fifth set of routes and wavelengths assigned to the set of services via the assignment algorithm based on the fifth set of values and the set of system characteristics, wherein the logic configured to compare the first set of routes and wavelengths assigned to the set of services to the second set of routes and wavelengths assigned to the set of services comprises logic configured to compare to each other the first set of routes and wavelengths assigned to the set of services, the second set of routes and wavelengths assigned to the set of services, the third set of routes and wavelengths assigned to the set of services, and the fifth set of routes and wavelengths assigned to the set of services based on the one or more fitness criteria, and wherein the logic configured to select between the first and second sets of values comprises logic configured to select between the first, second, third, and fifth sets of values based on the comparison.

* * * * *